(12) United States Patent
Isik et al.

(10) Patent No.: US 12,173,102 B2
(45) Date of Patent: Dec. 24, 2024

(54) REACTOR SYSTEM FOR PRODUCING MODACRYLIC POLYMER AND A PRODUCTION METHOD THEREOF

(71) Applicant: AKSA AKRILIK KIMYA SANAYII ANONIM SIRKETI, Yalova (TR)

(72) Inventors: Ahmet Safa Isik, Yalova (TR); Ilhan Canpolat, Yalova (TR)

(*) Notice: Subject to any disclaimer, the term of this patent is extended or adjusted under 35 U.S.C. 154(b) by 775 days.

(21) Appl. No.: 17/423,170

(22) PCT Filed: Jan. 10, 2020

(86) PCT No.: PCT/TR2020/050017
§ 371 (c)(1),
(2) Date: Jul. 15, 2021

(87) PCT Pub. No.: WO2020/149809
PCT Pub. Date: Jul. 23, 2020

(65) Prior Publication Data
US 2022/0127399 A1    Apr. 28, 2022

(30) Foreign Application Priority Data
Jan. 15, 2019    (TR) .................................. 2019/00627

(51) Int. Cl.
*C08F 220/44*    (2006.01)
*B01J 19/00*    (2006.01)
*B01J 19/18*    (2006.01)

(52) U.S. Cl.
CPC ......... *C08F 220/44* (2013.01); *B01J 19/0006* (2013.01); *B01J 19/1862* (2013.01);
(Continued)

(58) Field of Classification Search
CPC ........ B01J 19/00; B01J 19/0006; B01J 19/18; B01J 19/1862; B01J 2219/00;
(Continued)

(56) References Cited

U.S. PATENT DOCUMENTS 2,587,562 A * 2/1952 Wilson .................. C08F 263/04
526/319
2,936,303 A * 5/1960 Goins ........................ B01J 8/04
526/901
(Continued)

FOREIGN PATENT DOCUMENTS

CN    103313784 A    9/2013
CN    106498606 A    3/2017
(Continued)

OTHER PUBLICATIONS

International Search Report for corresponding PCT/TR2020/050017, dated Jul. 9, 2020.
Written Opinion of the International Searching Authority for corresponding PCT/TR2020/050017, dated Jul. 9, 2020.

*Primary Examiner* — Natasha E Young
(74) *Attorney, Agent, or Firm* — Egbert, McDaniel & Swartz, PLLC

(57) ABSTRACT

A reactor system for producing modacrylic polymer having a main tank with at least one feed inlet, a mixing element inside the main tank, a secondary tank connected to the main tank with an overflow channel, a reaction terminator feed and a level meter for the secondary tank, an outlet at the bottom of the secondary tank, a level control valve that controls the outlet, a collection area connected to the outlet, and a control unit configured to control the level control valve to determine output amount to be transferred to the collection area from the secondary tank according to data received from the level meter in order to keep the level in the secondary tank constant. The temperature in the main tank and the secondary tank is continuously measured and the main tank and the secondary tank temperature difference is arranged such that it does not exceed ±5° C.

21 Claims, 2 Drawing Sheets

(52) U.S. Cl.
CPC .............. *B01J 2219/00094* (2013.01); *B01J 2219/00162* (2013.01); *B01J 2219/00164* (2013.01); *B01J 2219/00182* (2013.01); *B01J 2219/00189* (2013.01)

(58) Field of Classification Search
CPC .... B01J 2219/00049; B01J 2219/00051; B01J 2219/00074; B01J 2219/00087; B01J 2219/00094; B01J 2219/00162; B01J 2219/00164; B01J 2219/00182; B01J 2219/00189; C08F 2/00; C08F 2/01; C08F 6/00; C08F 6/061; C08F 220/00; C08F 220/02; C08F 220/42; C08F 220/44; D01F 6/00; D01F 6/28; D01F 6/40
See application file for complete search history.

(56) References Cited

U.S. PATENT DOCUMENTS

| | | | |
|---|---|---|---|
| 3,630,986 A | | 12/1971 | Mison et al. |
| 4,164,489 A | * | 8/1979 | Daniels ................ C08F 263/04 526/331 |
| 8,153,735 B2 | * | 4/2012 | Weitzel ................ C08F 210/02 528/502 E |

FOREIGN PATENT DOCUMENTS

| | | | | |
|---|---|---|---|---|
| EP | 0271142 A2 | | 6/1988 | |
| EP | 0694566 A1 | | 1/1996 | |
| EP | 1106631 A1 | | 6/2001 | |
| EP | 3216898 A1 | * | 9/2017 | .............. C08J 3/097 |

* cited by examiner

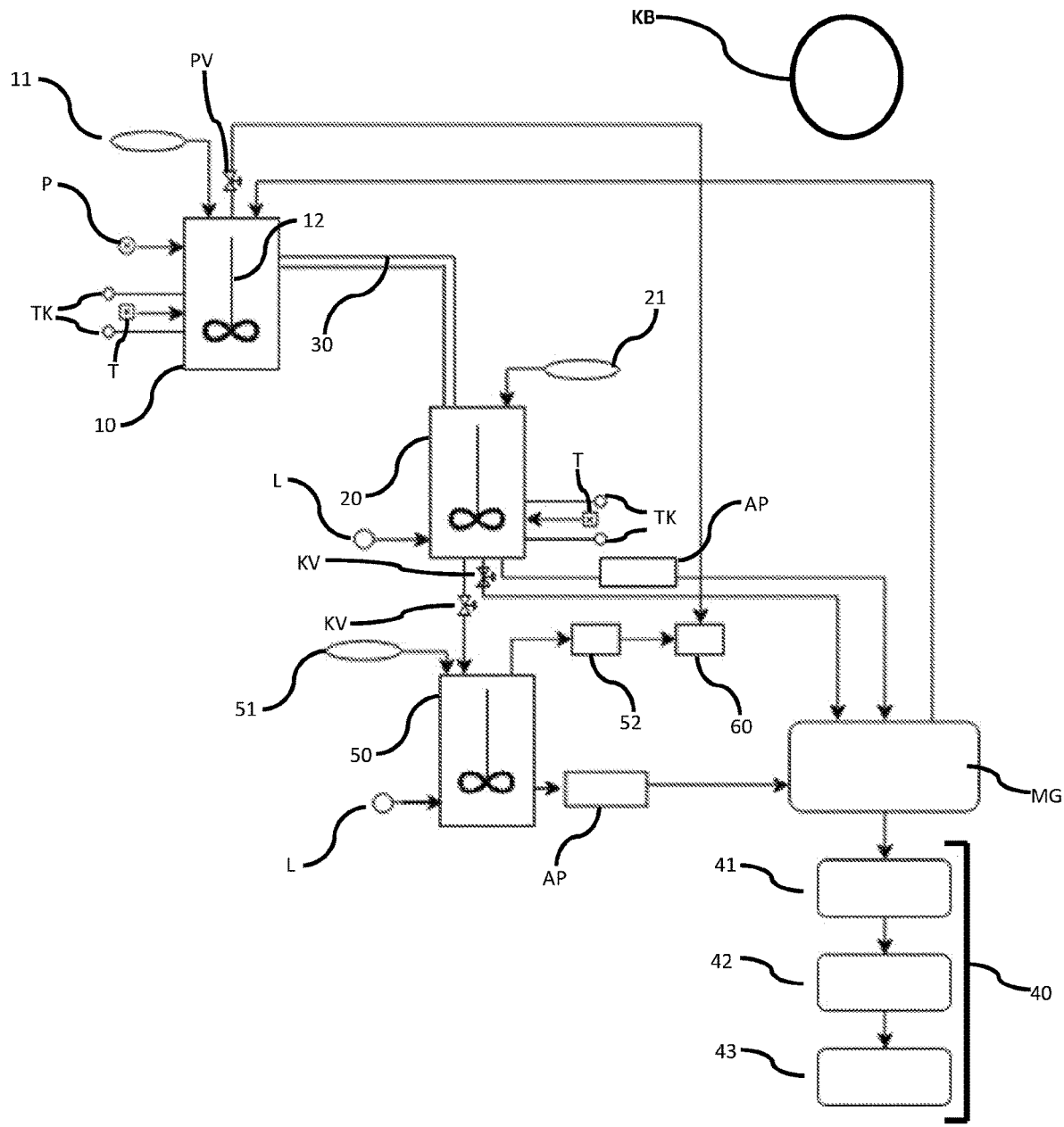
FIGURE 1.A

REACTOR SYSTEM FOR PRODUCING MODACRYLIC POLYMER AND A PRODUCTION METHOD THEREOF

This application is a national stage application, under 35 U.S.C. § 371, of PCT/TR2020/050017, now WO 2020/149809, filed Jan. 10, 2020, which claims benefit of Turkish Application No. TR2019/00617, filed Jan. 15, 2019, both of which are incorporated herein by reference in their entirety.

TECHNICAL FIELD

The invention is related to a pressurized continuous reactor system and to a modacrylic polymer production method.

PRIOR ART

Modacrylic polymer is obtained by means of suspension, emulsion or solution polymerization methods. Continuous systems cannot be used due to the chemical properties of ingredient monomers like vinyl chloride or vinylidene chloride, for the preparation of polymers that are required for modacrylic fibers during suspension polymerization. The boiling points of the mentioned monomers are quite low in comparison to the temperatures required for production. In such a case monomers turns into gas phase. Accordingly, in order to reduce the transition of liquid monomers into gas phase and maintain a stable reaction, the product is produced under pressure and by means of batch production method in a closed system.

Modacrylic polymerization is basically obtained by reacting acrylonitrile, vinylidene chloride (VDC), and/or vinyl chloride (VCM) monomer. The polymerization method is suspension, emulsion or solution. Reaction temperature of Modacrylic polymerization is between 40-80° C. Due to low boiling point of Vinyl chloride (−13.4° C.) and vinylidene chloride (32° C.) liquid monomers turn into gas phase during the reaction process. In order to reduce the gas phase transition of the monomers and to prevent releasing of the gas to atmosphere, reaction is carried out under pressure. At reaction temperature, monomers tend to turn into gas phase and since the reactor system is completely enclosed only a little portion of the monomers can turn into gas phase and pressurize the reactor until to a certain vapor pressure. Once the reactor is pressurized then no more monomer molecules change their phase.

There are several difficulties getting the product from the reactor in pressurized batch systems. While obtaining the product, the entire pressure of the system is lost and the monomers which are at the gas phase should be released. After the product is obtained, the system must be perfectly cleaned and the required medium for the reaction must be prepared from the beginning. Those cleaning and start-up operations cause longer downtimes.

Another disadvantage of the prior art is the difficulty of obtaining a stable product quality. Variations can be observed in the polymer; such as the molecular weight of the polymer, the co-monomer ratio, particle size, and reaction conversion.

Due to the closed structure of the batch system, it is very difficult or not possible to gather data regarding the product or to intervene during the reaction process. Any undesired condition in the reactor can make the entire raw material unusable.

In the Chinese Patent Office (SIPO) application document numbered CN103313784 (A), a batch production reactor and a method for carrying out polymerization reaction are disclosed. In this invention, the product is polymerized inside a reactor and is taken out of the tank after this process. In this system, the tank is ready for a new process only after it is completely cleaned and this leads to a lot of time loss.

In the Chinese Patent Office (SIPO) application document numbered CN106498606 (A), a modacrylic fiber blended fabric and a production method thereof are disclosed. The modacrylic fiber blended fabric has been prepared according to a prescription that is formed of 60-90% modacrylic fiber, 1-10% antistatic fiber, 0-38% carded cotton, 0-12% nylon fibers, 0-10% aramid fiber and 0-38% viscous fiber and the weight percent of all of the ingredients add up to 100%. The production process of producing modacrylic fiber blended fabric comprises the steps of processing the fiber raw materials as single strands of yarn, processing single yarns with ply yarns and weaving the ply yarns in order to obtain modacrylic fiber blended fabric.

In the European Patent Office (EPO) document with the application number EP0271142 (A2), modacrylic fiber endowed with characteristics of reduced flammability and production method thereof is disclosed. The method comprises the steps of obtaining a fiber mixture formed of 60 to 85 percent by weight polyoxadiazole fiber and 15 to 40 percent modacrylic fiber mix and converting the fiber mixture into a spun staple yarn.

The European Patent Office (EPO) document with the application number EP0694566 (A1) is related to a method for producing acrylic copolymers and to modacrylic copolymers obtained by means of said method. The invention is related to a process for producing, by means of polymerization, modacrylic copolymers comprising a halogenous comonomer and hydrophilic groups, together with a catalyzer. The polymerization is carried out in a reactor having a pipe shape that has a length/diameter ratio greater than 1.8. The comonomer that comprises acrylonitrile and hydrophilic groups is fed to the bottom section of the reactor and the catalyzer has a high decomposition rate such that it can decompose at a rate of at least 70% by weight.

As a result, all of the problems mentioned above have made it a necessity to provide a novelty in the related field.

OBJECTIVE OF THE INVENTION

The present invention aims to provide a technical novelty in the related field and to eliminate the problems mentioned above.

First aim of the invention is to design a reactor system which enables continuous production instead of batch production and a method for producing a polymer to be used in the production of modacrylic fibers using a similar embodiment.

Second aim of the invention is to accelerate the production process and to increase the amount of the products produced.

Third aim of the invention is to provide operational perfection and to enable automated continuous polymer production.

Another aim of the invention is to produce stable quality product in which you can directly intervene in any undesired condition occurrence.

BRIEF DESCRIPTION OF THE INVENTION

The present invention that shall be understood from the information provided above and the detailed description below aims to provide a reactor system for producing modacrylic polymers. Accordingly, the invention comprises;

A main tank for having at least a feed inlet in order to enable the addition of modacrylic input ingredients, A mixing element that has been provided inside the main tank, A secondary tank that has been connected to the main tank with an overflow channel, A reaction terminator feed for said secondary tank, A level meter which measures the level of the secondary tank according to the input provided from the overflow channel, An outlet provided at the bottom of the secondary tank, A level control valve that controls the outlet, A collection area that is connected to said outlet, A control unit is configured to control the level control valve to determine output amount to be transferred to the collection area from the secondary tank according to the data received from the level meter in order to keep the level in the secondary tank constant. In order to keep the temperature difference between main tank and the secondary tank stable and in a desired range, a temperature control system is installed.

According to another embodiment of the invention, said level control valve is an on/off valve.

According to a preferred embodiment of the invention, said control valve can also be a proportional valve.

According to an embodiment of the invention, the system has a cold water jacket in order to keep the temperature of the main tank constant and a hot water jacket in order to keep the temperature of said secondary tank constant. Cold water flow rate is regulated by flow control valve according the desired reaction temperature and hot water temperature for regulating the secondary tank's temperature can be adjusted according to the desired temperature difference between main and secondary tank.

According to a preferred embodiment of the invention said main tank comprises a pressure meter, a pressure control valve and the control unit has been configured to keep the pressure level in the main tank constant by discharging from the main tank by means of controlling the pressure control valve according to the data received from the pressure meter.

According to an embodiment of the invention, said collection area comprises an atmospheric tank that is connected to the outlet of the secondary tank via a level control valve.

According to another preferred embodiment of the invention, it comprises a monomer recovery unit that is connected to said atmospheric tank.

According to another embodiment of the invention, said collection area comprises a monomer recovery unit that is connected to the outlet provided at the bottom section of the secondary tank via a level control element.

According to another preferred embodiment of the invention, said monomer recovery unit is connected to the main tank.

According to another embodiment of the invention, said secondary tank comprises a reaction terminator feed.

According to another embodiment of the invention, said level control valve can be replaced by a transfer pump.

According to another preferred embodiment of the invention, it comprises a monomer recovery unit that is connected to said transfer pump.

The present invention that shall be understood from the information provided above and the detailed description below aims to provide is a pressurized reactor system for modacrylic polymer production and a production method. Accordingly, in the invention, the modacrylic polymer input ingredients are transferred to the main tank that is connected to a secondary tank via an overflow channel and said ingredients are mixed with a mixing element in order to start a reaction at temperatures between 30-90° C., when the modacrylic polymer input ingredients that start to reach the overflow level, they begin to continuously flow into the secondary tank and in order to end the reaction, the reaction terminator feed is added into the secondary tank, during the production process, at least a certain level of reaction output is provided at the secondary tank, the reaction output of the secondary tank, is transferred to the atmospheric tank in a controlled manner from the bottom of the secondary tank, the level of the secondary tank is measured continuously and the output amount that is to be transferred to the atmospheric tank from the secondary tank is determined in accordance with said level data, the temperature in the main tank and the secondary tank is continuously measured and the main tank and the secondary tank temperature difference is arranged such that it does not exceed ±5° C., According to a preferred embodiment of the invention, the pressure inside the main tank and the secondary tank is continuously measured and the system adjusts the pressure value by controlling the pressure control valve provided in the main tank or secondary tank in accordance with said pressure data.

According to another preferred embodiment of the invention, said reaction terminator comprises of ethylene diamine tetra acidic acid (EDTA) and deionized water.

According to a preferred embodiment of the invention said modacrylic polymer input ingredients comprise of monomer, comonomers, initiators and catalyzers.

According to another preferred embodiment of the invention, said monomer is acrylonitrile.

According to a preferred embodiment of the invention, said comonomer is selected from vinyl chloride or vinylidene chloride and mixtures thereof.

BRIEF DESCRIPTION OF THE FIGURES

In FIG. 1A, a representative schematic view of the system subject to the invention has been given. The required elements for a plurality of configurations have been shown together. Although the elements illustrated in the figures can be used together, they can also be used in different configurations.

DESCRIPTION OF THE REFERENCE NUMBERS IN THE FIGURES

Figure 1:
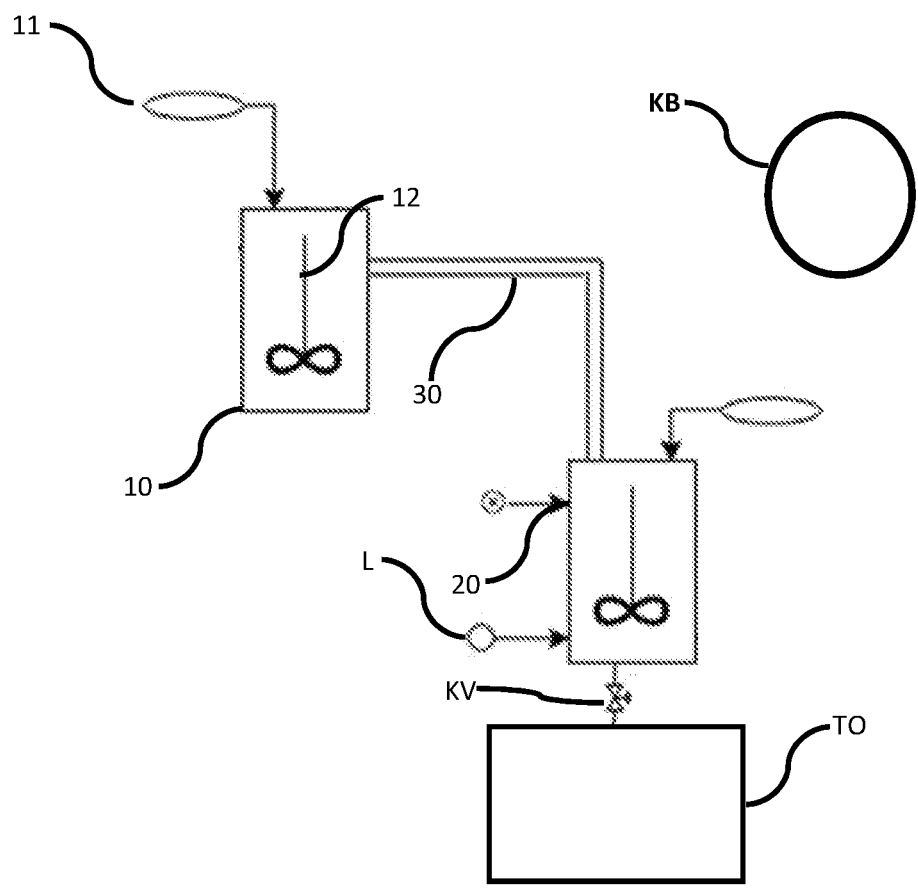
In FIG. 1, a representative schematic view of an embodiment of the system subject to the invention has been given.

10. Main tank
11. Feed inlet
12. Mixing element
20. Secondary tank
21. Reaction terminator feeding
30. Overflow channel
40. Product exit
41. Polymer filtering unit
42. Polymer drying unit
43. Polymer storage unit 50. Atmospheric tank
51. Balancing Feed
52. Breather condenser
60. Gas filtering unit
AP. Transfer pump
P. Pressure meter
L. Level meter
T. Temperature measurement device
KV. Level control valve
PV. Pressure control valve
TK. Temperature control element
MG. Monomer recovery unit
TO. Collection area

DETAILED DESCRIPTION OF THE INVENTION

In this detailed description, the pressurized continuous reactor system and the modacrylic polymer production method subject to the invention have been described with examples only to provide a better understanding of the subject without limiting the scope of the invention.

The invention is related to a pressurized continuous reactor system and a modacrylic polymer production method.

In FIG. 1, a representative schematic view of an embodiment of the system subject to the invention has been given.

The invention is related to a reactor system for producing modacrylic polymer characterized in that it comprises;

A main tank (10) comprising at least one feed inlet (11) to enhance the addition of the modacrylic input ingredients, A mixing element (12) that has been provided inside the main tank (10), A secondary tank (20) that has been connected to the main tank (10) with an overflow channel (30), A level meter (L) which measures the level of the secondary tank, An outlet provided at the bottom of the secondary tank (20), A level control valve (KV) that controls the outlet, A collection area (TO) that is connected to said outlet, and A control unit (KB) is configured to control the level control valve (KV) to determine output amount to be transferred to the collection area (TO) from the secondary tank (20) according to the data received from the level meter (L) in order to keep the level in the secondary tank (20) constant.

According to FIG. 1.A, the main tank (10) and the secondary tank (20) are preferably in cylindrical form and are connected to each other via an overflow channel (30) whose one end is connected to the main tank (10) and the other end is connected to the secondary tank (20). Forementioned overflow channel (30) has been configured such that when the level of the main tank (10) reaches the overflow channel (30) level, the product inside the main tank is transferred to the secondary tank (20).

The main tank (10) includes a feed inlet (11) for inputs that can provide modacrylic production. Preferably, the feed inlet (11) is provided at a level that is higher than the connection level of the overflow channel (30) that is connected to the main tank (10). The feed inlet (11) can not only be used with an autonomous input system but it can also be operated via manual feeding.

The main tank includes a mixing element (12). Besides this, the secondary tank (20) also includes a mixing element.

The secondary tank (20) includes a reaction terminator feed inlet (21). Said reaction terminator feed inlet (21) enables the addition of inputs such as ethylene diamine tetra acetic acid (EDTA) and deionized water in order to stop the reaction process of the modacrylic inputs within the secondary tank (20) that have started to react inside the main tank (10).

The outlet of the secondary tank (20) has been provided at the bottom of the tank and it has been connected to the collection area (TO). Outlet that located at bottom prevents discharge of the gas phase monomers which found in the main and secondary tank (10-20) and as a result, it enables the production to be continuous. During the polymerization, temperature and pressure variations affect quality of polymer. It is important for the main tank (10) and the secondary tank (20) to be balanced in order to obtain stable quality products. Pressure imbalance during the modacrylic polymer production may cause quality variations in molecular weight, particle size etc. and the temperature difference between the two tanks (10, 20) may lead to gas transfer (undesired monomer transfer) between main and secondary tanks (10, 20).

The level of the second tank is controlled by means of a level control valve (KV) that is provided at the bottom of the secondary tank (20) in order to maintain the pressure within balance. The control element (KV) is preferably a valve. The valve can be an on/off or proportional valve. The main tank (10) level cannot exceed the overflow channel level due to the presence of the overflow channel (30) and it remains constant. However the level inside the secondary tank differs due to inputs from the main tank or due to products that have been transferred from the outlet to the collection area (TO), and the difference in level leads to difference in pressure. Due to this reason, it needs to be operated at certain intervals, and it is provided by adjusting a certain flow rate from the bottom of the secondary tank. Accordingly, level control valve (KV), is controlled by means of a control unit. Secondary tank (20) comprises a level meter (L). The level meter (L) measures the liquid level inside the secondary tank continuously and it transfers this information to the control unit (KB). As a result, control unit (KB) opens the level control valve proportionally or completely.

In an alternative embodiment of the invention, instead of level control valve (KV) a transfer pump (AP) can also be used and the output is transferred to the collection area (TO) by means of said transfer pump (AP). Transfer pump speed is adjusted automatically according to the level information received from the level meter (L). The critical parameter here is selection of the pump, such that it can perform the transfer of the output into the atmospheric or vacuum environment, as the suction of the pump is pressurized.

Temperature of the main tank (10) and the secondary tank (20) is continuously measured by the temperature measurement devices (T) in order to maintain the temperature balance. Temperature control unit (KB) balances the temperature difference between the main tank (10) and the secondary tank (20) continuously by means of a temperature control element (TK). The control unit (KB) interferes with the temperature control element (TK) according to the information it receives from the temperature measurement device (T).

According to a preferred embodiment, the main tank (10) and the secondary tank (20) have been surrounded with water jackets. A cold water jacket is preferred at the main tank (10) in order to balance the exothermic reaction, however, in the secondary tank, a hot water jacket is preferred since the reaction is terminated in the secondary tank. The temperature control elements (TK) are the hot and cold outlets in this embodiment. Hot or cold water is transferred into said water jackets according to the data received from the temperature measurement devices (T). The level of this transfer is adjusted by means of the control unit (KB).

According to a preferred embodiment, a pressure meter (P) is provided in order to measure the pressure inside the system. Besides this, in any one of the tanks (10, 20), preferably in the main tank (10), a gas outlet has been provided and a pressure control valve (PV) has been connected to said gas outlet. The pressure control valve (PV) is controlled by the control unit (KB). The control unit (KB) keeps pressure constant by releasing a certain amount of gas, with the help of opening the pressure control valve (PV) when the pressure exceeds the desired pressure level, according to the data received from the pressure meter (P).

According to a preferred embodiment of the invention, the collection area (TO) is an atmospheric tank (50). Output of the reaction is transferred from secondary tank (20) to atmospheric tank (50). Atmospheric tank (50) preferably includes a mixing element. Besides this, atmospheric tank (50) may contain a balancing Feed (51) in order to provide various inputs to adjust pH level of the output received. Preferably atmospheric tank (50) has been connected to a monomer recovery unit (MG) via a transfer pump (AP). The monomer recovery unit (MG) is used to recover the monomers that have not been polymerized. In this embodiment, monomer recovery unit (MG) is connected to the product outlet (40) respectively comprising the filtering unit (41), the polymer drying unit (42) and the polymer storage unit (43). Preferably, atmospheric tank (50) comprises a gas filtering unit (60) in order to clean the output gas that may be released from breather condenser (52). The gas filtering unit (60) can be selected to be an incinerator. The main tank (10) gas outlet that has been mentioned before can be connected to a gas filtering unit (60).

According to an alternative embodiment of the invention, the secondary tank (20) outlet is connected to monomer recovery unit (MG) via a level control valve (KV). In this configuration, the level control valve (KV) can be an on/off valve or a proportional valve or a transfer pump (AP) can be used instead of level control valve.

The outlet of the monomer recovery unit (MG) that outputs monomers mentioned above has been connected to the main tank (10). The polymer outlet has been connected to the product outlet (40) respectively comprising the filtering unit (41), the polymer drying unit (42) and the polymer storage unit (43).

The modacrylic polymer production method is characterized by comprising the following steps;
  the modacrylic polymer input ingredients like monomers, catalysts, initiator are transferred to the main tank (10) that is connected to a secondary tank (20) via an overflow channel (30) and such ingredients are mixed with a mixing element (12) in order to start a reaction at temperatures between 40-80° C., preferably 50-60° C.
  when the modacrylic polymer input ingredients that start to react, reach the overflow level, they flow into the secondary tank (20) and in order to terminate the reaction, termination chemical is added into the secondary tank (20),
  during the production process, certain level of reaction output is provided at the secondary tank (20),
  the reaction output of the secondary tank, is transferred to the collection area (TO) in a controlled manner from the outlet,
  the level of the secondary tank (20) is measured continuously and the output amount that is to be transferred to the collection area (TO) from the secondary tank (20) is determined in accordance with said level data,
  the temperature in the main tank (10) and the secondary tank (20) is continuously measured and the main tank (10) and the secondary tank (20) temperature difference is arranged such that it does not exceed ±5° C., In the method of the invention, the modacrylic polymer input ingredients comprise monomer, comonomers, initiators and catalyzers. Said monomer is acrylonitrile. Said comonomer is selected from vinyl chloride or vinylidene chloride and mixtures thereof. Other comonomers are vinyl acetate or methyl acrylate. In order to increase dyeable groups, sodium methyl sulfonate, 2-Acrylamido-2-methyl-1-propane sulfonic acid (AMPS) or sodium styrene sulfonate (SSS) is added. Ammonium persulfate and sodium metabisulphite are used as a starter and catalyzer.

The reaction of said ingredients inside the main tank is carried out between 30-90° C., preferably 50-60° C.

Said mixture is transferred to the secondary tank (20) from the main tank (10) via an overflow channel (30). There must be some output product in the secondary tank (20) throughout production. A termination chemical is added to the mixture into the secondary tank during production. Such termination chemical comprises ethylene diamine tetra acetic acid (ETDA) and deionized water. The slurry, that is present in the secondary tank, is transferred to the atmospheric environment by means of an on/off valve or a proportional valve.

During the production, it is important for main tank (10) and secondary tank (20) to be on balance in order to obtain stable quality products. Variation of temperature during the modacrylic production process may prevent the production of a standardized product that has stable quality properties like narrow molecular weight distribution. Temperature difference between the two tanks (10, 20) may lead to gas transfer between said tanks (10, 20). Reaction pressure in both tanks (10, 20) are equal. However, the product level inside the secondary tank (20) differs due to inputs from the main tank or due to products that have been transferred from the outlet to the collection area (TO) and as a result the difference of level leads to difference in pressure. Main tank level (10) is fixed due to overflow channel (30). Level in the secondary tank (20) is measured online and the amount of product to be discharged from the outlet is determined accordingly. This process can be provided by means of the level control valve (KV) that is positioned at the outlet.

While an exothermic reaction can be carried out in the main tank (10), as the reaction is terminated only in the secondary tank (20), a temperature difference is created between the two tanks and as it has been mentioned before, this difference causes gas transition between tanks (10, 20). In order to prevent it, temperatures of the tanks (10, 20) are continuously measured and the temperature is adjusted such that the temperature difference is at most ±5 degrees, preferably ±1 degrees and particularly such that the temperatures of the tanks are equal. In order to balance the temperature, a cold water jacket is preferred at the main tank in order to stabilize the exothermic reaction. However, hot water jacket is preferred since reaction is terminated only in the secondary tank. The control mentioned here is provided by adjusting the hot or cold water that is provided in the water jackets by means of the control unit (KB).

According to a preferred embodiment of the invention, if the pressure exceeds the desired limit, gas can be released from any one of the tanks (10,20). The gas release is carried out by means of a pressure control valve (PV) The control unit (KB) opens and closes the pressure control valve (PV), according to the data received from the pressure meter (P) that is provided from any one of the tanks (10, 20).

According to a preferred embodiment of the invention, the product can be transferred into an atmospheric tank (50) from the secondary tank (20) and the product can be collected without a pressure loss inside the main tank (10) or the secondary tank (20). Preferably pH adjusters are added to the atmospheric tank (50) at this stage and the pH adjuster can be selected as sodium hydroxide. The product can be transferred into a monomer recovery unit (MG) from the atmospheric tank. Outlet of the monomer recovery unit which are acrylonitrile, vinylidene chloride or vinyl chloride can be connected to the main tank (10) and the polymer outlet can be connected to the product outlet (40, 41, 42) that are filtration, drying and storage processes. Preferably the atmospheric tank (50) gas outlet can be connected to a gas filtering unit (60). The gas filtering unit (60) can be selected to be an incinerator. A breather condenser (52) can be attached to the line before the gas filtering unit.

According to an alternative embodiment of the invention, secondary tank (20) outlet is connected to a monomer recovery unit (MG) via a level control valve (KV). In this configuration, level control valve (KV) can be an on/off valve or a proportional valve. Instead of a level control valve (KV) a transfer pump (AP) can also be used.

The protection scope of the invention has been described in the attached figures and it cannot be limited to the embodiments described in the detailed description that has been provided for illustration purposes. It is obvious that the person skilled in the art can set forth similar embodiments under the light of the information described above.

The invention claimed is:

1. A reactor system for producing a modacrylic polymer, the reactor system comprising:
   a main tank having at least one feed inlet, the at least one feed inlet adapted to feed modacrylic polymeric input ingredients into said main tank;
   a mixing element positioned in said main tank;
   a second tank connected to said main tank by an overflow channel, said second tank having an outlet at a bottom thereof;
   a reaction terminator feed connected to said second tank;
   a level meter adapted to measure a level within said second tank;
   a level control valve cooperative with the outlet of said second tank so as to control a level in said second tank;
   a collection area con to the outlet of said second tank; and
   a control unit cooperative with said level control valve so as to control said level control valve in order to determine an amount to be transferred through the outlet of said second tank to said collection area in relation to data received from said level meter in order to keep the level in said second tank constant, said control unit configured to control a temperature control element in relation to data received from a temperature measurement device so as to control a temperature difference between said main tank and said second tank.

2. The reactor system of claim 1, wherein said level control valve is an on/off valve.

3. The reactor system of claim 1, wherein said level control valve is a proportional valve.

4. The reactor system of claim 1, further comprising:
   a cold water jacket cooperative with said main tank so as to keep a temperature of said main tank constant; and
   a hot water jacket cooperative with said second tank so as to keep a temperature of said second tank constant, said control unit being configured to change a flow rate of cold water to cold water jacket relative to a feedback from the temperature control element.

5. The reactor system of claim 1, wherein said main tank has a pressure meter and a pressure control valve, said control unit configured to keep a pressure constant in said main tank by discharging a gas from said main tank via the pressure control valve according to data received from the pressure meter.

6. The reactor system of claim 1, wherein said collection area comprises an atmospheric tank connected to the outlet of said second tank via said level control valve.

7. The reactor system of claim 6, further comprising:
   a monomer recovery unit connected to the atmospheric tank.

8. The reactor system of claim 7, wherein said collection area is connected to an outlet of said monomer recovery unit.

9. The reactor system of claim 7, wherein said monomer recovery unit is connected to said main tank.

10. The reactor system of claim 7, further comprising:
    a transfer pump cooperative with said atmospheric tank adapted to transfer from the atmospheric tank to said monomer recovery unit.

11. The reactor system of claim 10, wherein said monomer recovery unit is connected to said transfer pump.

12. A method of producing a modacrylic polymer, the method comprising:
    transferring modacrylic polymer input ingredients to a main tank, the main tank being connected to a second tank by an overflow channel;
    mixing the transferred modacrylic polymer input ingredients with a mixing element so as to initiate a reaction at temperatures of between 30° C. and 90° C.;
    continuously flowing the mixed modacrylic polymer input ingredients into the second tank when the modacrylic polymer input ingredients reach an overflow level;
    adding a reaction terminator feed into the second tank in order to end this reaction, the second tank having a level of reaction output;
    transferring the reaction output to an atmospheric tank in a controlled manner from a bottom of the second tank;
    continuously measuring the level of the second tank;
    transferring an output amount to a collection area from the second tank relative to the continuously measured level of the second tank;
    continuously measuring a temperature in the main tank and a temperature in the second tank; and
    maintaining a difference in the continuously measured temperature in the main tank and the temperature in the second tank, the difference being not more than 5° C.

13. The method of claim 12, further comprising:
    continuously measuring a pressure in the main tank or the second tank; and
    gas discharging from one of the main tank and the second tank in accordance with pressure data from the continuously measured pressure in the main tank or the second tank.

14. The method of claim 12, wherein the reaction terminator feed is ethylene diamine tetra acetic acid and deionized water.

15. The method of claim 12, wherein the modacrylic polymer input ingredients are selected from the group consisting of a monomer, a comonomer, a catalyzer and combinations thereof.

16. The method of claim 12, wherein the modacrylic polymer input ingredients is the monomer, the monomer being an acrylonitrile.

17. The method of claim 12, wherein the modacrylic polymer input ingredients is the comonomer, the comonomer selected from the group consisting of vinyl chloride, vinylindene chloride and mixtures thereof.

18. The method of claim 12, wherein the collection area is the atmospheric tank.

19. The method of claim 12, further comprising:
    connecting the atmospheric tank to a monomer recovery unit.

20. The method of claim 12, further comprising:
    connecting the collection area to a monomer recovery unit.

21. The method of claim 20, further comprising:
    connecting the monomer recovery unit to the main tank.

\* \* \* \* \*